United States Patent [19]

Wolf et al.

[11] Patent Number: 4,990,679
[45] Date of Patent: Feb. 5, 1991

[54] POLY(TETRAHYDROFURAN)

[75] Inventors: Jean-Pierre Wolf, Marly, Switzerland; Frans Setiabudi, Bad Krozingen, Fed. Rep. of Germany

[73] Assignee: CIBA-GEIGY Corporation, Ardsley, N.Y.

[21] Appl. No.: 441,138

[22] Filed: Nov. 22, 1989

[30] Foreign Application Priority Data

Nov. 23, 1988 [CH] Switzerland ............... 4350/88-9
Sep. 7, 1989 [CH] Switzerland ............... 3247/89-7

[51] Int. Cl.$^5$ .................................. C07C 321/04
[52] U.S. Cl. .................................. 568/62
[58] Field of Search .............. 568/62; 549/472; 528/417

[56] References Cited

U.S. PATENT DOCUMENTS 3,431,239 3/1969 Morris et al. ............ 568/62
3,728,400 4/1973 Michelotti et al. ........ 568/62
4,259,474 3/1981 Chakrabarti et al. ...... 568/62
4,355,185 10/1982 Bergthaller et al. ....... 568/62

FOREIGN PATENT DOCUMENTS 2000658 7/1971 Fed. Rep. of Germany .
1031039 5/1966 United Kingdom .
1077997 8/1967 United Kingdom .

OTHER PUBLICATIONS

Abstract of DD256,715 (East German Patent), Published 1988.
M. Movsumzade et al., Chemical Abstracts, vol. 89, Number 196941n (1978).
Organic Synthesis, Coll. vol. 3, pp. 698-700 (1955) and Coll. vol. 4, pp. 401-403 (1963), Wiley, NY.

Primary Examiner—Mary E. Ceperley
Attorney, Agent, or Firm—Stephen V. O'Brien

[57] ABSTRACT

Polytetrahydrofuran-dithiols of the formula I

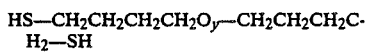

in which y is an integer from 2 to 30, are suitable as hardeners for epoxide resins, in particular in combination with amines. The hardened systems show good mechanical properties and increased flexibility.

7 Claims, No Drawings

POLY(TETRAHYDROFURAN)

The invention relates to novel poly(tetrahydrofuran)-dithiols, to a process for preparing them, to their use as hardeners for epoxide resins and to the crosslinked products obtainable thereby.

U.S. Pat. No. 3,728,400 describes a process for the preparation of polymercaptans. Organic polyhalogen compounds are here reacted with sodium hydrosulfide under defined reaction conditions. Thus, for example, bis-(4-chlorobutyl) ether is converted in this way to the corresponding dithiol. The compounds thus prepared are suitable as hardeners for epoxide resins, fully hardened resins of good tensile shear strength being obtained.

U.S. Pat. No. 4,259,474 describes sulfur-containing polyoxyalkylenes, also including polymers which, in addition to other recurring oxyalkylene units, contain an oxybutylene radical. The polymers can, inter alia, also contain thiol end groups and are used especially as lubricants for metals.

DD No. 256,715 describes a process for the preparation of high-molecular thermoplastic epoxide/amine/-dithiol polyadducts, which are soluble in various solvents and have mean molecular masses $\overline{M}_n$ of >5000. Oxyalkylene-dithiols, for example triglycol dithiol, are also used as the dithiol.

German Offenlegungsschrift No. 2,934,948 describes a process for the preparation of mercaptoalkyl sulfides and mercaptoalkyl ethers, also including SH-terminated polyethylene glycols, by hydrazinolysis of the corresponding isothiuronium salts. The compounds are suitable as intermediates for sulfur-containing substances which are used in photography.

The present invention relates to poly(tetrahydrofuran)-dithiols of the formula I

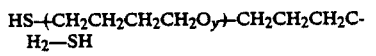

in which y is an integer from 2 to 30.

The invention also relates to a process for preparing the dithiols of the formula I by converting a poly(tetrahydrofuran)-diol of the formula II

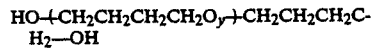

to the corresponding dihalogen derivative of the formula III

in which X is Cl, Br or I and y is as defined above, and subsequent conversion of the dihalogen derivative to the dithiol of the formula I.

Poly(tetrahydrofuran)-diols of the formula II are known and also commercially available. Examples of such products are Poly-THF 650 ®, Poly-THF 1000 ® or Poly-THF 2000 ® from BASF, which are compounds of the formula II with y equal to 7–8, 12–13 and 26–27 respectively. The preparation of dithiols starting from diols is known per se. In a preferred process, the diol of the formula II is converted by reaction with thionyl chloride in the presence of a base to a dichloro derivative of the formula III with X=Cl, the compound of the formula III is reacted with thiourea to give the isothiuronium chloride of the formula IV

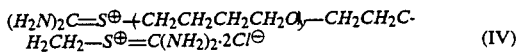

and the latter is then hydrolysed to the dithiol of the formula I.

The said reaction of alcohols to give thiols is described, for example, in Organic Synthesis, Collective Volume 3, pages 698–700, and Collective Volume 4, pages 401–403, Wiley, New York 1955 and 1963 respectively.

Those dithiols according to the invention are preferred in which y is an integer from 5 to 30, especially from 7 to 27. Dithiols in which y is 7 to 8, 12 to 13 or 26 to 27 are most preferred.

The compounds according to the invention preferably have a mean molecular weight $\overline{M}_n$ of less than 2000 and in particular of less than 1000.

The dithiols according to the invention are particularly suitable as hardeners for epoxide resins. The invention thus also relates to the use of the dithiols of the formula I as hardeners for epoxide resins and to the crosslinked products obtainable thereby.

Particularly good results are obtained when the dithiols according to the invention are used as hardeners together with amines, in particular with amines having at least two primary amino groups.

Epoxide resins hardened with such mixtures are distinguished by increased flexibility and tough-elastic properties, combined with strength and hardness values which are still good.

The epoxide resin used can in principle be any compound conventional in epoxide resin technology.

Examples of epoxide resins are:
(I) Polyglycidyl esters and poly-(β-methylglycidyl) esters obtainable by reacting a compound having at least two carboxyl groups in the molecule and epichlorohydrin or β-methyl-epichlorohydrin respectively. The reaction is appropriately carried out in the presence of bases.

Aliphatic polycarboxylic acids can be used as the compound having at least two carboxyl groups in the molecule. Examples of these polycarboxylic acids are oxalic acid, succinic acid, glutaric acid, adipic acid, pimelic acid, suberic acid, azelaic acid or dimerized or trimerized linoleic acid.

However, cycloaliphatic polycarboxylic acids can also be used, for example tetrahydrophthalic acid, 4-methyltetrahydrophthalic acid, hexahydrophthalic acid or 4-methylhexahydrophthalic acid.

Moreover, aromatic polycarboxylic acids can be used, for example phthalic acid, isophthalic acid or terephthalic acid.

(II) Polyglycidyl ethers or poly-(β-methylglycidyl) ethers obtainable by reacting a compound having at least two free alcoholic hydroxyl groups and/or phenolic hydroxyl groups and epichlorohydrin or β-methylepichlorohydrin under alkaline conditions, or in the presence of an acidic catalyst and subsequent alkali treatment.

Ethers of this type are derived, for example, from acyclic alcohols such as ethylene glycol, diethylene glycol and higher polyoxyethylene glycols, propane-1,2-diol or polyoxypropylene glycols, propane-1,3-diol, butane-1,4-diol, polyoxytetramethylene glycols, pentane-1,5-diol, hexane-1,6-diol, hexane-2,4,6-triol, glycerol, 1,1,1-trimethylolpropane, pentaerythritol, sorbitol and also from polyepichlorohydrins.

They can, however, also be derived, for example, from cycloaliphatic alcohols such as 1,4-cyclohexanedimethanol, bis-(4-hydroxycyclohexyl)-methane or 2,2-bis-(4-hydroxycyclohexyl)-propane, or they have aromatic nuclei, such as N,N-bis-(2-hydroxyethyl)-aniline or p,p'-bis-(2-hydroxyethylamino)-diphenylmethane.

The epoxide compounds can also be derived from mononuclear phenols, for example from resorcinol or hydroquinone; or they are based on polynuclear phenols, for example bis-(4-hydroxyphenyl)-methane, 4,4'-dihydroxybiphenyl, bis-(4-hydroxyphenyl) sulfone, 1,1,2,2-tetrakis-(4-hydroxyphenyl)-ethane, 2,2-bis-(4-hydroxyphenyl)-propane, 2,2-bis-(3,5-dibromo-4-hydroxyphenyl)-propane or on novolaks obtainable by condensation of aldehydes, such as formaldehyde, acetaldehyde, chloral or furfural, with phenols such as phenol or with phenols which are substituted in the nucleus by chlorine atoms or $C_1$–$C_9$alkyl groups, for example 4-chlorophenol, 2-methylphenol or 4-tert-butylphenol, or by condensation with bisphenols in the way described above.

(III) Poly-(N-glycidyl) compounds obtainable by dehydrochlorination of the reaction products of epichlorohydrin with amines which contain at least two amine hydrogen atoms. These amines are, for example, aniline, n-butylamine, bis-(4-aminophenyl)-methane, m-xylylenediamine or bis-(4-methylaminophenyl)-methane.

The poly-(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as 5,5-dimethylhydantoin.

(IV) Poly-(S-glycidyl) compounds, for example di-S-glycidyl derivatives derived from dithiols, for example ethane-1,2-dithiol or bis-(4-mercaptomethylphenyl) ether.

(V) Cycloaliphatic epoxide resins, for example bis-(2,3-epoxycyclopentyl) ether, 2,3-epoxycyclopentyl glycidyl ether, 1,2-bis-(2,3-epoxycyclopentyloxy)-ethane or 3,4-epoxycyclohexylmethyl 3',4'-epoxycyclohexanecarboxylate.

However, epoxide resins can also be used in which the 1,2-epoxide groups are bound to different heteroatoms or functional groups; these compounds include, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

Preferably, epoxide resins having an epoxide content of 2 to 10 equivalents/kg are used, which are glycidyl ethers, glycidyl esters or N-glycidyl derivatives of aromatic, heterocyclic, cycloaliphatic or aliphatic compounds.

Epoxide resins used particularly preferably are polyglycidyl ethers of polyhydric phenols, for example of 2,2-bis-(4-hydroxyphenyl)-propane (bisphenol A) or bis-(4-hydroxyphenyl)-methane (bisphenol F).

The most preferred epoxide resins are the diglycidyl ethers of bisphenol A.

Any desired amine having more than two N-H bonds can be used as the amine component. Amines having at least two primary amino groups, i.e. at least 2 $NH_2$ groups, are used preferably. Such amines can have two or even more $NH_2$ groups and can also contain secondary and/or tertiary amine nitrogen atoms in addition.

Examples of suitable polyamines are aliphatic, cycloaliphatic, aromatic and heterocyclic amines, such as bis-(4-aminophenyl)-methane, aniline/formaldehyde resins, bis-(4-aminophenyl) sulfone, propane-1,3-diamine, 2,2-dimethyl-1,3-propanediamine (neopentanediamine), hexamethylenediamine, diethylenetriamine, bis-(3-aminopropyl)-amine, N,N-bis-(3-aminopropyl)-methylamine, triethylenetetramine, pentaethylenehexamine, 2,2,4-trimethylhexane-1,6-diamine, m-xylylenediamine, 1,2- and pentaethylenehexamine, 2,2,4-trimethylhexane-1,6-diamine, m-xylylenediamine, 1,2-and 1,4-diaminocyclohexane, bis-(4-aminocyclohexyl)-methane, 2,2-bis-(4-aminocyclohexyl)-propane and 3-aminomethyl-3,5,5-trimethylcyclohexylamine (isophoronediamine), polyaminoimidazolines as well as polyaminoamides, for example those of aliphatic polyamines and dimerized or trimerized fatty acids. Other suitable polyamines are the polyoxyalkyleneamines known as Jeffamines ® sold by Texaco, for example Jeffamine ® EDR 148, D 230, D 400 or T 403. When aliphatic or cycloaliphatic amines are used, glycidyl esters are preferably not used as the resins.

Aliphatic or cycloaliphatic polyamines are preferred. Amongst the cycloaliphatic polyamines, 3-aminomethyl-3,5,5-trimethylcyclohexylamine (isophoronediamine), bis-(4-aminocyclohexyl)-methane, bis-(3-methyl-4-aminocyclohexyl)-methane and polyaminoimidazolines, for example the polyaminoimidazoline sold by Schering AG as Eurodur ® 370, are particularly preferred. Amongst the aliphatic polyamines, compounds of the formulae V to X are preferred

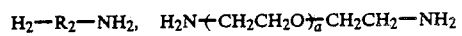

(V)    (VI)

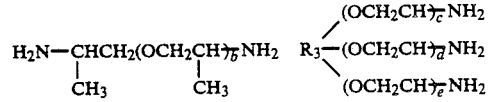

(VII)    (VIII)

(IX)

(X)

in which $R_2$ is a straight-chain or branched $C_2$–$C_{10}$alkylene radical, a is an integer from 1 to 10, preferably 2, b is an integer from 1 to 10, preferably 2 to 6, c, d and e independently of one another are an integer from 1 to 20, preferably 2 to 5, f is an integer from 1 to 5, preferably 1, and g is an integer from 1 to 10, preferably 1 to 5, and $R_3$ is a trivalent radical of the formulae.

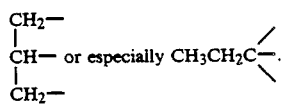

2,2,4-Trimethylhexane-1,6-diamine, Jeffamine ® EDR 148 of the formula VI with a = 2, Jeffamine ® D 230 or D 400 of the formula VII with b = 2–3 or b = 5–6 respectively, Jeffamine ® T 403 of the formula VIII, bis-(3-aminopropyl)-amine, diethylenetriamine, triethylenetetramine and pentaethylenehexamine are very particularly preferred.

In addition to the preferred polyamines having at least 2 NH$_2$ groups, the hardener mixture can also contain minor quantities of other amines, for example in amounts of less than 50% by weight of the amine, relative to the total amine content. An example of such an amine is 3-(N,N-dimethylaminopropyl)-3'-aminopropylamine.

If desired, the hardenable mixtures of epoxide resin materials can also contain hardening accelerators, although mixtures without a hardening accelerator are preferred. Examples of hardening accelerators are tertiary amines, salts or quaternary ammonium compounds thereof, such as benzyldimethylamine, 2,4,6-tris-(dimethylaminomethyl)-phenol, 1-methylimidazole, 2-ethyl-4-methylimidazole, 4-aminopyridine, tripentylammonium phenate or tetramethylammonium chloride; or alkali metal alcoholates, such as Na alcoholates of 2,4-dihydroxy-3-hydroxymethylpentane; or substituted ureas, such as N-(4-chlorophenyl)-N',N'-dimethylurea or N-(3-chloro-4-methylphenyl)-N',N'-dimethylurea (chlorotolurone).

In addition to the dithiols of the formula I, the mixtures of materials can also contain minor quantities, for example in amounts of less than 50% by weight, relative to the dithiol of the formula I, of other dithiols or polythiols. Suitable such diols are compounds of the formula XI

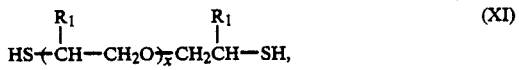

in which the R$_1$s independently of one another are hydrogen or methyl and x is an integer from 2 to 50.

The dithiols of the formula XI can be polyethylene glycol derivatives, polypropylene glycol derivatives or also copolymers having oxyethylene units and oxypropylene units. The copolymers can be block polymers or random polymers. The corresponding block polymers are sometimes also described as polypropylene glycol ethoxylate or polyethylene glycol propoxylate, depending on whether they have terminal polyethylene glycol blocks or polypropylene glycol blocks. The commercially available polypropylene glycols predominantly have secondary terminal hydroxyl groups, as is shown for the corresponding dithiols of the formula XI. It is self-evident that polypropylene-dithiols having primary thiol groups can also be used as a component of the hardenable mixtures of materials.

Dithiols of the formula XI having a molecular weight $\overline{M}_n$ of less than 2000, in particular less than 1000, are preferred.

Dithiols of the formula XI, in which x is an integer from 2 to 20, especially from 2 to 12, are particularly preferred.

The dithiol of the formula XI in which R$_1$ is hydrogen and x=2, is most preferred. This last-mentioned dithiol is also known as triglycol dimercaptan or 1,2-bis-(2'-mercaptoethoxy)-ethane.

The hardening of the mixtures of materials in general takes place even at low temperatures from about 0° C. to room temperature. If desired, hardening can also be carried out or, if appropriate, completed at a higher temperature, for example at about 40° to 100° C. One of the advantages of the present mixtures of materials is that, depending on the choice of the dithiols and of the amines and, if desired, a hardening accelerator and depending on the relative quantity of the dithiols and of the amines, the pot life of the hardenable mixtures can be adjusted virtually as desired. The same applies also to the properties of the hardened products. Depending on the nature and the relative quantity of the dithiol and the amine, epoxide resin systems having a very wide range of flexibility and toughness can be prepared. The total quantity of the hardener is preferably calculated such that it corresponds to the stoichiometrically required quantities.

Depending on the nature of the epoxide resin used or its epoxide equivalent, and of the dithiol and amine used, the relative quantities of the components can vary very widely.

The quantities of the dithiol and of the amine employed will also depend on the intended application, i.e. on the desired flexibility of the hardened product and on the desired pot life of the mixture of materials. In general, both the flexibility and the pot life rise with an increase in the relative quantity of the dithiol in the dithiol/amine mixture.

5–30% by weight, preferably 10–25% by weight, of dithiol and 3–35% by weight, preferably 5–20% by weight, of amine, relative to the total quantity of the ternary dithiol/amine/epoxide resin mixture have proved to be particularly suitable.

Particularly good properties of the hardened products are also achieved if the proportion of the hydrogen atoms bound to the thiol groups of the dithiol is 15–85%, preferably 20–80% and particularly preferably 25–75%, relative to the total number of the active hydrogen atoms bound to the thiol groups of the dithiol and those bound to the amino group of the amine.

If desired, plasticizers can also be added to the mixtures according to the invention for a further increase in flexibility. All the compounds known as plasticizers in the art can here be used. Examples of suitable plasticizers are dibutyl phthalate, esters of phthalic acid, esters of phosphoric acid, esters of adipic and sebacic acid, glycols, esters of glycolic acid or polyols.

Benzyl alcohol and especially 3-phenylpropanol have proved to be particularly suitable plasticizers.

The quantity of the plasticizer is preferably 4–25 parts by weight, especially 6–20 parts by weight, relative to 100 parts by weight of epoxide resin.

If desired, reactive diluents, for example butanediol diglycidyl ether, butyl glycidyl ether, 2,2,4-trimethylpentyl glycidyl ether, phenyl glycidyl ether, cresyl glycidyl ether or glycidyl esters can be added to the hardenable mixtures in order to reduce the viscosity.

The hardenable mixtures of materials can also contain adhesion promoters. In principle, any known adhesion promoter can be used. Silanes, for example γ-glycidyloxypropyltrimethoxysilane (Silane A-187 made by Union Carbide) or γ-mercaptopropyltrimethoxysilane (Silane A-189 made by Union Carbide) or titanium compounds such as tetraisopropyl bis-(dioctylphosphonato)-titanate (KR 41B made by Kenrich Petrochemicals Inc., U.S.A.), have proved to be particularly suitable adhesion promoters.

As further conventional additives, the mixtures according to the invention can also contain extenders, fillers and reinforcing agents, for examle bituminous coal tar, bitumen, textile fibres, glass fibres, asbestos fibres, boron fibres, carbon fibres, mineral silicates, mica, quartz powder, hydrated alumina, bentonites, wollastonite, kaolin, silica aerogel or metal powders, for example aluminium powder or iron powder, and also pigments and dyes, such as carbon black, oxide pigments and titanium dioxide, flameproofing agents, thixotropic agents, flow control agents such as silicones, waxes and stearates, some of which are also used as mould-release agents, antioxidants and light stabilizers.

The hardenable mixtures of material can be prepared in the conventional manner by mixing the components by means of known mixing apparatus (stirrers, rollers).

The hardened products are distinguished by the advantageous properties described at the outset. Fully hardened epoxide resins having the flexibility and tough-elastic properties of the products according to the invention have so far not been known. In addition, the crosslinked products according to the invention, in spite of their high flexibility and tough elasticity, also show outstanding mechanical and thermal properties.

The hardenable mixtures can be used, for example, as adhesives, matrix resins, surface coatings, sealing compositions or injection compositions or quite generally for the manufacture of hardened products. They can be used in a formulation adapted to each specific field of application, in the unfilled or filled state, for example as sealing compositions, paints, coating compositions, surface coatings, dipping resins, casting resins, impregnating resins, laminating resins, matrix resins and adhesives.

The examples which follow explain the invention.

EXAMPLE 1:

Preparation of the poly(tetrahydrofuran)-dithiols A-C

HS—(CH$_2$CH$_2$CH$_2$CH$_2$O)$_y$—CH$_2$CH$_2$CH$_2$—SH

A: y = 7–8; B: y = 12–13; C: y = 26–27

500 ml of thionyl chloride are added dropwise under N$_2$ to 1 mol of the appropriate poly-THF (commercial product from BASF AG) and 1 ml of pyridine at 40°–50° C. The clear, yellowish solution is boiled for 6 hours at 80° C. under reflux. Excess thionyl chloride is distilled off in vacuo and the yellow viscous poly-THF dichloride is dried at 80° C. in a high vacuum. The poly-THF dichloride obtained in this way is added dropwise to a boiling solution of 2.2 mol of thiourea in 650 ml of 95% ethyl alcohol and boiled overnight at 76° C. under reflux. The ethyl alcohol is then distilled off, and 0.5 g of benzyltrimethylammonium chloride and 600 ml of 6 N NaOH solution are added to the viscous residue. The mixture is boiled for 2 hours at 95° C., then cooled to 60° and acidified to pH=2 with 32% HCl in portions. After cooling to room temperature, 750 ml of ethyl acetate are added, the phases are separated, and the organic phase is washed with H$_2$O, dried over Na$_2$SO$_4$ and concentrated in vacuo.

| Dithiol | Physical data | | |
|---|---|---|---|
| | A | B | C |
| Yield | 91% | 90% | 90% |
| $\overline{M}_n$ (GPC in THF) | 1137 | 1719 | 3090 |
| $M_w/M_n$ | 1.68 | 1.87 | 2.78 |
| S content[1] (% by weight) | 7.7 | 5.7 | 2.68 |
| SH content[2] (meq./g) | 2.07 | 1.56 | 0.68 |
| Viscosity[3] at 40° C. (mPa.s) | 175 | 366 | 2420 |
| Melting range | liquid at room temperature | 23–27° C. | 30–35° C. |

[1]Elemental analysis
[2]Titration with 0.1 N AgNO$_3$
[3]ICI cone and plate viscometer

EXAMPLES 2–3:

Mixtures of epoxide resin materials containing poly(tetrahydrofuran)-dithiols A or B The composition of the mixtures of materials used in the examples and the properties of the hardened products can be seen from the table. The hardening is carried out for one week at 80° C. in each case.

| Example | | 2 | 3 |
|---|---|---|---|
| Epoxide resin[1] | (g) | 100 | 100 |
| Dithiol A | (g) | 25.1 | — |
| Dithiol B | (g) | — | 13.7 |
| Amine 1[2] | (g) | — | — |
| Amine 2[3] | (g) | 54.4 | 57.9 |
| Elongation at break | (%) | 74 | 65 |
| Tear strength[4] | (N/mm$^2$) | 11.8 | 23.5 |
| Tensile strength[4] | (N/mm$^2$) | 11.8 | 33.4 |
| Shore D Hardness[5] | | 35 | 68 |
| T$_G$[6] | (°C.) | 18 | 38 |

[1]Bisphenol A diglycidyl ether having an epoxide equivalent weight of 190.5 g/equivalent
[2]2,2,4-Trimethylhexane-1,6-diamine
[3]Jeffamine ® D 400 from Texaco
[4]DIN 53455
[5]Determined by means of the FRANK hardness tester 38024
[6]Mettler TA 3000

What is claimed is:

1. A poly(tetrahydrofuran)-dithiol of the formula I

HS—(CH$_2$CH$_2$CH$_2$CH$_2$O)$_y$—CH$_2$CH$_2$CH$_2$—SH
(I)

in which y is an integer from 2 to 30.

2. A dithiol according to claim 1, wherein y is an integer from 5 to 30.

3. A dithiol according to claim 1, wherein y is 7 to 8.

4. A dithiol according to claim 1, wherein y is 12 to 13.

5. A dithiol according to claim 1, wherein y is 26 to 27.

6. A dithiol according to claim 1, wherein the mean molecular weight $\overline{M}_n$ is less than 2000.

7. A dithiol according to claim 6, wherein the mean molecular weight $\overline{M}_n$ is less than 1000.

* * * * *

UNITED STATES PATENT AND TRADEMARK OFFICE
CERTIFICATE OF CORRECTION

PATENT NO. : 4,990,679

DATED : FEBRUARY 5, 1991

INVENTOR(S) : JEAN-PIERRE WOLF, ET AL.

It is certified that error appears in the above-identified patent and that said Letters Patent is hereby corrected as shown below:

COLUMN 8
Claim 1, line 2, formula should read

-- $HS-(CH_2CH_2CH_2CH_2O)_y-CH_2CH_2CH_2CH_2-SH$ --.

Signed and Sealed this

Seventeenth Day of November, 1992

Attest:

DOUGLAS B. COMER

Attesting Officer

Acting Commissioner of Patents and Trademarks